UNITED STATES PATENT OFFICE.

FRANCIS M. YOUNG, OF CHICAGO, ILLINOIS.

ART OF MAKING WHISKY.

SPECIFICATION forming part of Letters Patent No. 321,169, dated June 30, 1885.

Application filed April 17, 1885. (No specimens.)

*To all whom it may concern:*

Be it known that I, FRANCIS MARION YOUNG, a citizen of the United States, residing in the city of Chicago, in the county of Cook and State of Illinois, have invented a new and useful Improvement in the Art of Making Whisky, of which the following is a specification.

The object of my invention is to obtain a greater yield of whisky from a given quantity of grain by preventing the formation of acid at the expense of the starch and sugar of the grain in the fermentation which precedes the distilling process.

To this end my invention consists in the addition to the mash to be distilled, previous to the fermentation thereof, of a properly-regulated quantity of the liquid slop or spent beer resulting from previous distillation. In this slop there is always present a greater or less proportion of acid, which is generally lactic acid, with a very small proportion of succinic acid, and it is by the introduction of this acid in proper quantity into the mash previous to its fermentation that the subsequent formation of acid during the fermenting process at the expense of the sugar and starch in the grain is prevented, or very greatly reduced, and the yield of whisky increased.

In carrying out my invention I use the slop or spent beer, freed to as great a degree as may be convenient from the solid and insoluble matters. Its addition to the mash may be made in various ways—as, for instance, it may be used in a cold state instead of water for filling up the fermenting-tubs, or in a hot state for scalding and mashing the grain in the mashing-tubs, or it may be introduced in either a hot or cold state into the mash-tubs, after the mashing has been performed, for the purpose of thinning down the mash. The slop or spent beer may be freed from its solid and insoluble matters to prepare it for use by being allowed to settle in settling-tanks.

The quantity of acid which I have found it desirable that the mash should contain previous to its fermentation in order to obtain the best yield of whisky should be such that not more than two cubic centimeters of a normal alkaline solution would be required to neutralize the acid contained in one hundred cubic centimeters of mash; or, in other words, that the addition of not more than two per cent. of a normal alkaline solution would be required to neutralize the acid in a given quantity of mash. This condition may be ascertained by taking a measured small quantity of the mash to be used and adding slop in measured small quantities and testing with the normal alkaline solution as often as may be necessary till it is ascertained that the required degree of acidulation is arrived at, and then adding slop in the same proportion to the whole of the mash to be treated, the quantity of the slop to produce the requisite degree of acidulation of the mash requiring to be varied according to the degree of acidity of the slop. While the acidulation should not exceed that which would require two per cent. of a normal alkaline solution to neutralize it, good results may be obtained by a lower degree of acidulation. The normal alkaline solution which I generally use for the test is an aqueous solution of sodic hydrate (NaHO) containing four (4) grams of the hydrate in every one hundred grams of the solution; but other normal alkaline solutions might be used—as, for instance, one of potassic hydrate (KHO) containing five and six-tenths (5.6) grams of the hydrate in every one hundred grams of the solution.

As no special apparatus is required for carrying out my invention, but the apparatus employed may be the same as is used in all distilleries, I have not deemed it necessary to illustrate it by a drawing.

I am aware that for the purpose of increasing the yield in the manufacture of whisky there have been practiced various processes for the utilization of slop or spent beer by mixing the latter with fresh material for subsequent fermentation, and therefore I do not claim, broadly, the mixing of slop with fresh material for subsequent fermentation in the manufacture of whisky; but I believe that all of those processes have had for their object either the utilization of such particles of starch, sugar, and other matter contained in the slop as could be converted into alcohol or the use of some other property than that of the acid in the slop; and so far as I am able to learn the quantity of slop which has been so mixed with fresh material has not been regulated according to any definitely-ascertained system. My process differs from all of these in that I do not obtain the increase of the yield from the slop itself, but I obtain it from the fresh material by the use of the acid in the slop only to produce a preparatory acidulation of the mash, by which I prevent the formation of acid at the expense of the starch and sugar of the grain in the new fermentation, and in order to do this I use the slop in such properly and definitely limited quantities as are found necessary to effect the desired result.

What I claim as my invention, and desire to secure by Letters Patent, is—

The improvement in the art of manufacturing whisky, consisting in the preparatory acidulation of the mash to a degree which would require for neutralization the addition of not more than about two per cent. of a normal alkaline solution by the addition to the mash of a properly determined quantity of liquid slop to produce such degree of acidulation, whereby the subsequent formation of acid at the expense of the sugar and starch in the grain is prevented or reduced, substantially as herein described.

F. M. YOUNG.

Witnesses:
 FREDK. HAYNES,
 MATTHEW POLLOCK.